US006831596B1

(12) United States Patent
Tsui et al.

(10) Patent No.: US 6,831,596 B1
(45) Date of Patent: Dec. 14, 2004

(54) CALIBRATING THE SAMPLING FREQUENCY OF A GPS RECEIVER

(75) Inventors: James B. Y. Tsui, Dayton, OH (US); David M. Lin, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/409,707

(22) Filed: Apr. 4, 2003

(51) Int. Cl.[7] .................................................. G01S 5/14
(52) U.S. Cl. .................................................. 342/357.02
(58) Field of Search ...................... 342/357.02, 357.03, 342/357.09, 357.15

(56) References Cited

U.S. PATENT DOCUMENTS 5,623,414 A     4/1997  Misra 6,347,113 B1    2/2002  Hatch

*Primary Examiner*—Gregory C. Issing
(74) *Attorney, Agent, or Firm*—Gerald B. Hollins; Thomas L. Kundert

(57) ABSTRACT

An arrangement for calibrating the sample frequency determining clock in a global position system receiver using signals received from a Wide Area Augmentation System satellite or other Wide Area Augmentation System signal source. Such Wide Area Augmentation System based clock calibration is free of the Doppler frequency effects impressed on a global position system signal in view of the geo-stationary orbit of a Wide Area Augmentation System satellite. Use of the calibration invention enables correction of the pseudo range determination accomplished with global position system receiver output data. The invention may be considered a new use of signals available from the Wide Area Augmentation System. A noise-considered arrangement for comparing Wide Area Augmentation System and global position system frequencies is included.

16 Claims, 9 Drawing Sheets

CALIBRATING THE SAMPLING FREQUENCY OF A GPS RECEIVER

RIGHTS OF THE GOVERNMENT

The invention described herein may be manufactured and used by or for the Government of the United States for all governmental purposes without the payment of any royalty.

BACKGROUND OF THE INVENTION

In recent years a system to improve the accuracy of pseudo range-determined position identifications by the global position system to enable such higher accuracy applications as aircraft landings and harbor navigations has been implemented. This supplement to the global position system is identified as the Wide Area Differential GPS (DGPS) or more commonly as the Wide Area Augmentation System (WAAS). In principle this Wide Area Augmentation System involves an additional station, possibly a satellite station, in which there is computed a range error correction for each global position system satellite that is in view from a particular earth location. After computing these range error corrections the correction data is broadcast to GPS users located in the satellite use area. One class of input data employed by a Wide Area Augmentation System station in computing range error corrections is data received from a plurality of ground stations also located in the satellite use area.

The pseudo range determination, with its use of the Coarse Acquisition Code (C/A Code) A portion of the information available from a GPS signal, is of course only one of a plurality of position determinations that become available with the aid of GPS signals. The P Code portion of a GPS signal provides another position determination arrangement, an arrangement that is dependent on a security coding arrangement provided-for in the GPS signal format. The P code portion of the GPS signal has been reserved for military and other government uses. Generally this P code portion of the GPS signal may be located in time within the GPS signal with the aid of the C/A code and following such location the C/A code becomes of little additional value in the processing. A system having some similarity to but different protocols from the GPS system has been deployed by former Soviet Union nations. The present invention is believed to also be usable in conjunction with such system.

As is more fully disclosed in the paragraphs following herein we have found that data received from an implemented Wide Area Augmentation System station is also useful for correcting another error often encountered in a C/A code based global position system receiver, i.e., the frequency of the receiver's sampling clock. Since this receiver sampling clock frequency determines the accuracy of one position location factor, the pseudo-range determination, made by the receiver, i.e., the determination of distance between the receiver and the global position system satellite, an error in this range determination degrades a user position computation made by global position system techniques and is therefore desirably avoided.

The pseudo-range when calculated by a GPS receiver depends on the accuracy of the receiver sampling frequency, which in turn depends on the accuracy of a receiver oscillator. If the sampling frequency is inaccurate, the pseudo-range will have a directly related error, which of course degrades the calculated user position. An accurate oscillator is however expensive to achieve in a GPS receiver. The accuracy of a low cost oscillator is usually less than desired in that the output frequency can be off from the specified value. It is thus important to know the true sampling frequency of a receiver in order to correct the accomplished calculations of user position. One way to obtain this sampling frequency knowledge is to use a frequency counter as may be accomplished in the laboratory; such counter equipment is however unavailable to many potential users of a GPS receiver.

The Wide Area Augmentation System (WAAS) provides an alternative arrangement for accurately determining receiver sampling frequency; this arrangement is the essence of the present invention. The Wide Area Augmentation System uses geo-stationary satellites, satellites receiving measured data from a plurality of ground stations, and subsequently transmits pseudo-range correction information to adjacent GPS users. Since Wide Area Augmentation System satellites are disposed in geo-stationary earth orbits, the Doppler frequency shift caused by satellite motion is quite small in such a signal i.e., on the order of a few hundred Hertz at the greatest; the Doppler frequency shift of an earth bound Wide Area Augmentation System station is of course zero. The signal transmitted by a WAAS station, i.e., either a satellite or earth bound station, can thus be used to calibrate the sampling frequency of a GPS receiver in the manner disclosed below.

With respect to accuracy of a Wide Area Augmentation System-based determination of receiver sampling frequency, the WAAS signal frequency is 1575.42 megahertz and the sampling frequency of a GPS receiver is in the neighborhood of 5 megahertz. The ratio of these two frequencies is about 300; thus, a 100-Hertz inaccuracy in the WAAS (as may for example result from the quite small Doppler effects) will reflect as about 0.3 Hertz (100/300) of frequency inaccuracy with respect to the crystal of a global position system receiver. The error of the sampling frequency measured by the approach of the present invention should therefore be less than 1 Hertz. It is significant however that the WAAS signal can be rather weak for users in certain areas. The noise component in the received WAAS signal can therefore be a significant factor in determining an actual global position system receiver sampling frequency and is considered in our invention as is disclosed below herein.

SUMMARY OF THE INVENTION

The present invention provides a calibration arrangement for the sampling frequency clock of a global position system receiver, a calibration arrangement based on the accurate atomic clock frequency determination and the low Doppler component reference available in a Wide Area Augmentation System signal.

It is another object of the invention to provide a new use for a Wide Area Augmentation System station.

It is therefore an object of the invention to provide a new use for existing information in a Wide Area Augmentation System signal.

It is another object of the invention to provide a convenient and accurate calibration arrangement for the sampling frequency clock of a global position system receiver.

It is another object of the invention to provide a calibration arrangement for the sampling frequency clock of a global position system receiver, a calibration arrangement exclusive of or tolerant of real world effects including Doppler frequency change effects and unfavorable signal to noise ratios.

It is another object of the invention to seize upon the advantages that the geo-stationary satellite orbit and low Doppler frequency shift a Wide Area Augmentation System signal inherently make available for exploitation.

It is another object of the invention to provide a signal noise considered arrangement for comparing the frequency of two differing signals.

These and other objects of the invention will become apparent as the description of the representative embodiments proceeds.

These and other objects of the invention are achieved by the method of providing pseudo range determinations of limited receiver sampling frequency inaccuracy influence from a global position system radio receiver, said method comprising the steps of:

coupling signals received from at least one global position system satellite and signals received from a Wide Area Augmentation System station into said global position system radio receiver;

extracting signals representing radio receiver sampling frequency from a global position system satellite signal processing portion of said global position system radio receiver;

educing signals representing a course acquisition code portion of said Wide Area Augmentation System signal received from said Wide Area Augmentation System station;

comparing said signals representing radio receiver sampling frequency with a selected number of said signals representing a course acquisition code portion of said Wide Area Augmentation System signal;

correcting pseudo range computations accomplished in said satellite signal processing portion of said global position system radio receiver, computations influenced by said global position system radio receiver sampling frequency, by a correcting factor responsive to differences between said signals representing radio receiver sampling frequency and signals representing a course acquisition code portion of said Wide Area Augmentation System signal as determined in said comparing step.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

Figure 9:
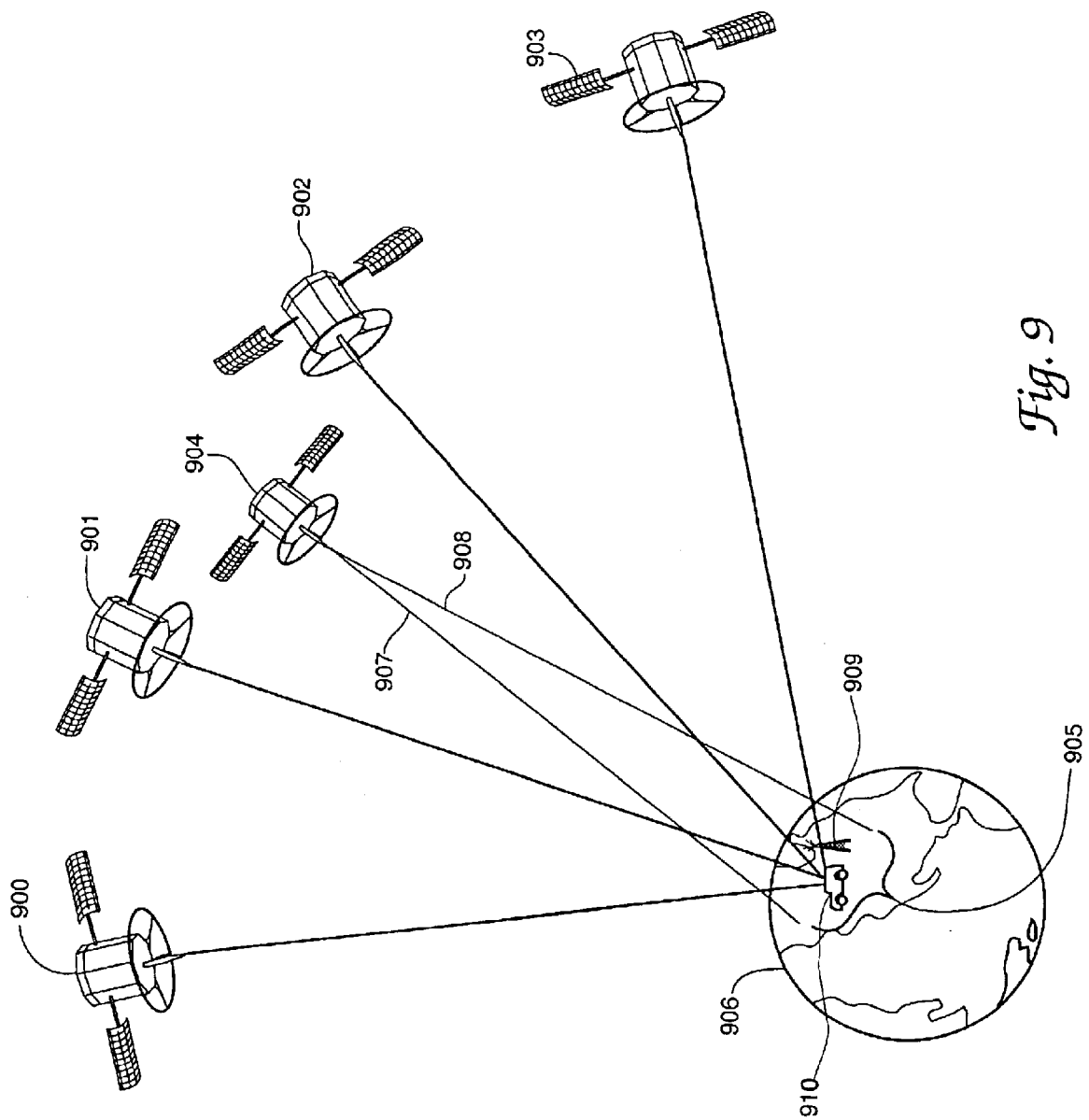
FIG. 9 shows a representative perspective view of signal sources considered in the present invention.

FIG. 9 in the drawings shows a perspective view of typical signal sources considered in the present invention. In the FIG. 9 drawing there is represented the four global position system satellites 900, 901, 902 and 903 normally considered to be within view of any point on the surface of the earth, 906, at a particular instant of time. The satellites 900, 901, 902 and 903 are disposed in orbits locates about 22,000 miles above the earth and are moving with respect to the surface of the earth i.e., these satellites reside in non-geo-stationary orbits. Also represented in FIG. 9 is a Wide Area Augmentation System satellite 904 providing an accuracy improvement function with respect to the satellites 900, 901, 902 and 903 and enabling use of data provided by these satellites in for example aircraft landing and other higher accuracy position determinations.

Data from the Wide Area Augmentation System satellite 904 is supplied to a plurality of global position system receivers located within an area 905 located on the surface of the earth 906. Data from each of the satellites 900, 901, 902 and 903 is also available to numerous radio receivers also located within the area 905 and in larger earth surface locations. For present purposes however only the reception of this satellite 904 data at a single point on the earth need be considered. The Wide Area Augmentation System station located within the satellite 904 may alternately be disposed on the surface of the earth within the area 905 as is represented by the tower at 909 in the FIG. 9 drawing. Signals from the four satellites 900, 901, 902 and 903 represented in FIG. 9 may be for example considered as being received by a global position system receiver located in the vehicle 910. Each of the elements and the distances shown in FIG. 9 are of course drawn to a differing scale.

In contrast with the moving status of the satellites 900, 901, 902 and 903 with respect to the earth's surface and the continuing "rise" and "setting" of each satellite of this type when viewed from a fixed location on the earth, the satellite 904 in its geo-stationary orbit provides a signal that is continuously received but received only within the area 905. Moreover in response to such considerations as the size of the area 905 and the limited energy available in a satellite, the signal received from at least satellite 904 in FIG. 9 is of somewhat limited strength and often impaired significantly by the presence of noise. This noise is a point of consideration in the present invention as is discussed subsequently herein. Both the global position system satellites 900, 901, 902 and 903 and the Wide Area Augmentation System satellite 904 are provided with highly accurate internal clocks, clocks based on the atomic clock principle and ground sourced corrections for example.

Details concerning the theory, implementation and operation of the global position system and also concerning the Wide Area Augmentation System supplement to the global position system are now known in the electronic art. Numerous books, journal articles and patents have disclosed technical information of this nature to a degree suggesting the present document repeat only especially relevant limited portions of this information. With respect to U.S. Patents inclusive of informative discussion regarding the global position system, the Wide Area Augmentation System and heretofore used cooperation between these systems, the following patents are believed inclusive of significant teaching discussions: the U.S. Pat. No. 5,623,414 of P. N. Misra; the U.S. Pat. No. 6,201,497 of D. M. Snyder et al.; the U.S. Pat. No. 6,347,113 of R. R. Hatch et al.; the U.S. Pat. No. 6,469,663 of M. L. Whitehead et al. and the U.S. Patent application 2002/0101912 of R. E. Phelts et al. The contents of these several patent documents is hereby incorporated by reference herein.

As has been stated above herein the present invention provides a new use for signals available in relatively pure and unencumbered form, signals free of Doppler effects and other degradations, from a Wide Area Augmentation System station such as the transmitter disposed in the satellite 904 in the FIG. 9 drawing. Such new use of Wide Area Augmentation System signals provides a capability by which pseudo range computations performed from received global position system signals may be compensated for errors attributable to receiver clock inaccuracies. The clock frequency inaccuracies of concern in this compensation may arise from cost considerations in receiver design and fabrication, from component aging or failures or other sources. In many global position system receivers for example the clock controlling the receiver's sampling frequency is a quartz crystal-controlled electronic circuit rather than the significantly more complex, expensive and accurate atomic clock used in the FIG. 9 satellites. In a handheld consumer global position system receiver for example the need to limit costs and promote wider receiver sales essentially precludes use of anything more complex than a quartz-controlled crystal clock circuit. Even such low cost receivers may therefore be amenable to improvement through use of the present invention.

Figure 1:
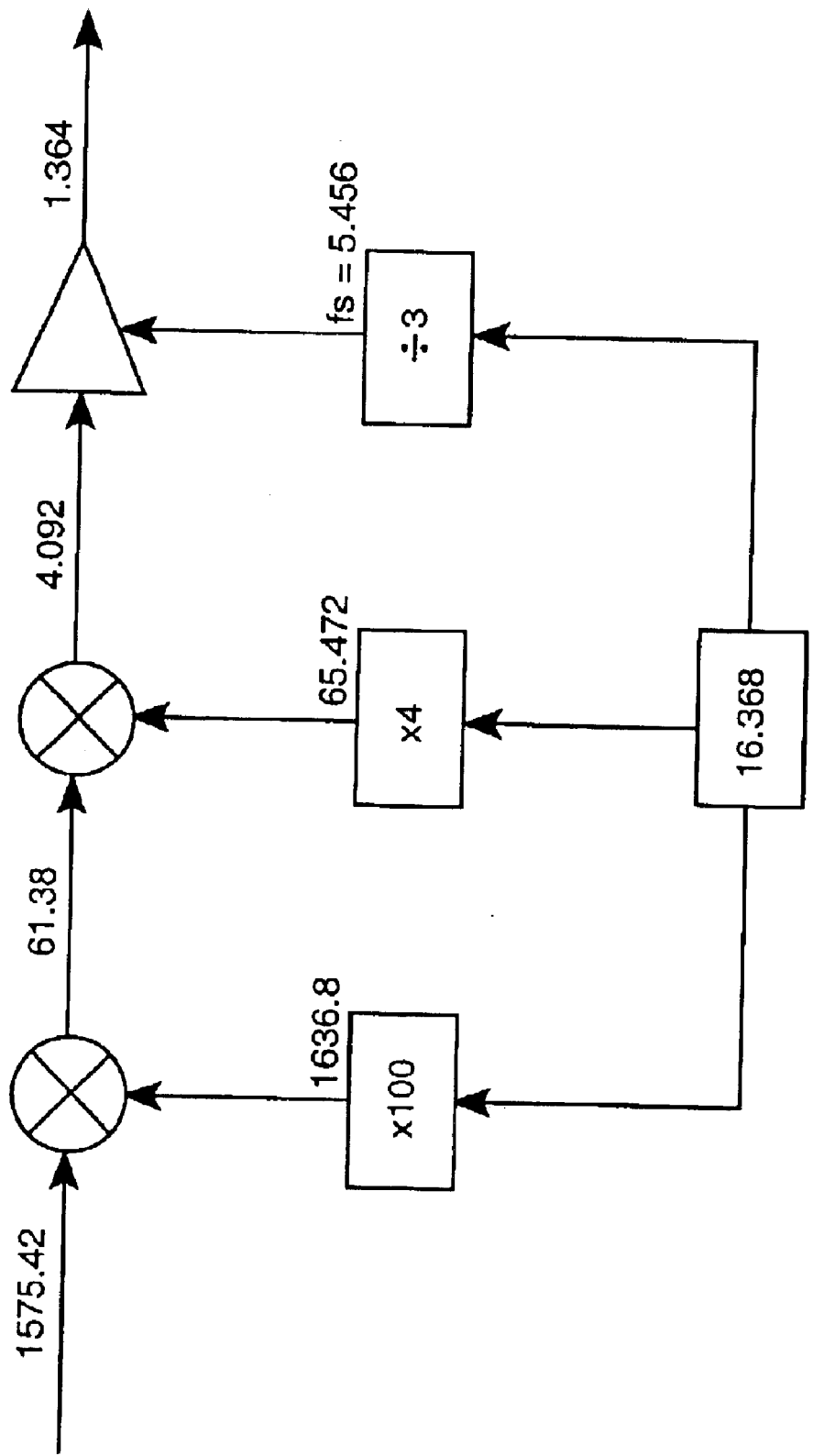
FIG. 1 shows one arrangement of signal frequencies and signal processing flows usable in the present invention.

An often-used related-frequencies plan for performing data collection in a global position system receiver is shown in the drawing of FIG. 1 herein. In FIG. 1 the numbers shown are frequencies in megahertz, and are considered to be nominal values since they are determined by the receiver manufacturer and are often not maintained to high accuracy. The purpose of the present invention is to accurately determine the sampling frequency ($f_s$), appearing at the right in FIG. 1, in a global position system receiver of the type using the FIG. 1 frequency relationships. The nominal frequency of $f_s$ is 5.456 megahertz in for example some receivers available from Motorola Corporation. A modified version of such receiver may be used as the data collection system in the present invention.

The Coarse/Acquisition (C/A) code portion in a Wide Area Augmentation System signal repeats every millisecond just as does the C/A code rate in a global position system satellite signal; however, the navigation data rate in the Wide Area Augmentation System is 500 Hertz, providing a 2-milliseconds period. This rate is 10 times higher than the 50 Hertz, 20-milliseconds data rate of satellites in the global position system constellation. Because of this higher data rate the combination of a 1 millisecond coherent integration and a 20 millisecond incoherent integration may be used for a present invention comparison of these two rates. The comparison may be based on a time domain analysis.

Even though the length of the C/A code as it is transmitted from a global position system satellite is 1 millisecond, Doppler shifts, arising from satellite motion and relative position with respect to a receiver, can change this code length in a received signal. Since the signal from the Wide Area Augmentation System satellite has zero or near zero Doppler frequency, as a result of the geo-synchronous orbit of the Wide Area Augmentation System satellite, the duration of each C/A code from this source should be exactly 1 millisecond in a received signal. If we assume that the sampling frequency is equal to the specified frequency, every one millisecond of received signal will result in 5456 points of digitized data-in accordance with the FIG. 1 frequency arrangement used in a Motorola receiver. Moreover at some point within this 5456 points the C/A code has an initial point, a point of interest with respect to the present invention.

If a comparison is made between the C/A code received from a Wide Area Augmentation System satellite and the sampling clock frequency of the receiver when the sampling frequency is correct, the location of the C/A code initial points within a received Wide Area Augmentation System C/A code will appear to remain the same in each sample interval of the receiver. Thus the C/A code initial point will appear in the same location of the receiver's first millisecond sample and the receiver's 1000th millisecond sample. Conversely if the receiver sampling frequency is incorrect, the initial points of each C/A code sample will change. This relationship is useful in embodying the present invention.

Figure 2:
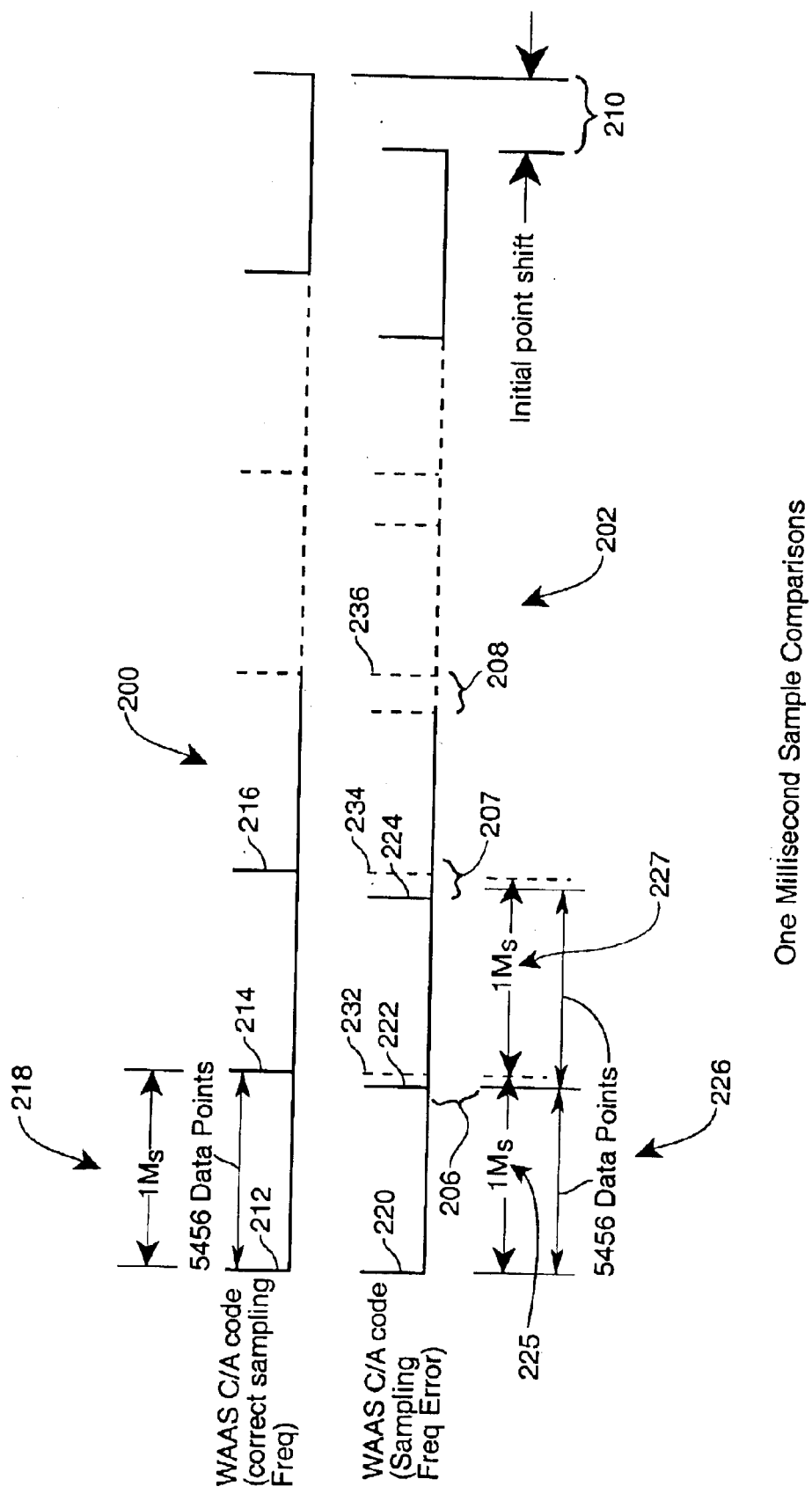
FIG. 2 shows a representation of receiver sampling frequency error in a comparison of one-millisecond samples.

The effects of sampling frequency error are illustrated in the drawing of FIG. 2 herein. In the FIG. 2 drawing there is represented a comparison of two signal reception situations involving two different receiver sampling frequency conditions. The received waveform situation shown at 200 in FIG. 2 represents an optimum reception of a continuing sequence of C/A code emissions, via a Doppler effect-free signal path, from a Wide Area Augmentation System satellite, and in a receiver having the intended sampling frequency. In the case of the herein identified Motorola receiver involving the frequencies shown in the FIG. 1 drawing the receiver sampling frequency resulting in the FIG. 2 waveform 200 is the correct nominal frequency of 5.456 megahertz. Each of the tic marks 212, 214 and 216 shown in the FIG. 2 waveform 200 represents the initial point in a new C/A code sequence, i.e., the phase transitions used to segregate adjacent code words in a series of C/A code words. As the waveform 200 is transmitted from the Wide Area Augmentation System satellite these tic marks are separated by a time interval of one millisecond. Moreover as the waveform 200 is received under the optimum and Doppler free conditions represented in waveform 200 these tic mark-identified phase change events continue to be separated by a time interval of one millisecond as indicated at 218 in FIG. 2. Located between the tic marks 212, 214 and 216 in the FIG. 2 waveform 200 are the 5,456 coding events or data points of a C/A code word as is also indicated at 218 in FIG. 2.

An incorrect sampling frequency condition is represented by the waveform at 202 in FIG. 2. The received waveform situation shown at 202 in FIG. 2 also represents reception of the continuing sequence of C/A code emissions, via a Doppler effect-free signal path, from a Wide Area Augmentation System satellite, but in a receiver having a sampling frequency differing from the intended sampling frequency. In the case of the herein described Motorola receiver involving the frequencies shown in the FIG. 1 drawing, the receiver sampling frequency resulting in the FIG. 1 waveform differs from the correct nominal frequency of 5.456 megahertz. Each of the tic marks 220, 222 and 224 shown in the FIG. 2 waveform 202 continues to represent 5456 sampled data points as in the waveform 200 as is indicated at 226. In the waveform 202 however these 5456 sampled data points and the tic marks 220, 222 and 224 are shown to occur prior to the dotted tic marks 232 and 234 that continue to be located at the times of 1 millisecond as indicated at 225 and 227; this prior occurrence is attributable to the receiver sampling frequency error. As a result of this error more than 5456 sampled data points occur in the 1 millisecond time intervals 225 and 227 and this waveform 202 condition is thus the result of a sampling clock that is running too fast.

Since the sampling frequency accomplishing the FIG. 2 waveform 202 is in error the location of the tic marks and phase change events in the waveform 202 changes in the locations 206, 207 and 208 and so on with respect to the corresponding tic marks of the waveform 200. As shown in FIG. 2 the sampling frequency relating to the waveform 202 differs from the optimum frequency and the waveform 202 tic marks at 222 and 224 appear to move to the left with respect to those at 214 and 216 in waveform 200. Following occurrence of the FIG. 2 illustrated six C/A code words the accrued difference in C/A code initial points has accumulated to the amount indicated at 210 in FIG. 2.

Theoretically, the determination of receiver sampling frequency can be accomplished in a simple manner and only two points of data are needed for such a determination. For example, one can measure the initial C/A code points at times of 0 and 1000 milliseconds along the Wide Area Augmentation System samples. If the global position system sampling frequency is higher than the correct value, the later initial points will shift to the left as is shown at 210 in the FIG. 2 drawing and if sampling frequency is lower a right shift occurs. Alternately if we assume the initial C/A point is disposed for example at clock count 2000 along the Wide Area Augmentation System C/A code samples and the last initial C/A shifted left by p points of the Wide Area Augmentation System samples, the location of the last initial C/A code point is at 2000-p along the Wide Area Augmentation System samples. Since from 0 to 1000 milliseconds covers 1 second of time, there are total 5456000+p sample periods in the Wide Area Augmentation System samples. Thus, the actual sampling time ta in the global position system receiver is $$t_s = \frac{1}{5456000 + p} \text{ or } f_s = 5456000 + p \text{ Hz} \quad (1)$$

In theory this simple equation could be used to find the global position system receiver sampling frequency, however such an arrangement is susceptible to noise difficulty and another arrangement is thus more desirable.

Although a number of arrangements can be used to determine the global position system sampling frequency with respect to the more accurate Wide Area Augmentation System sampling clock frequency (essentially this is a comparison of two frequencies) we believe one desirable arrangement for determining the global position system sampling frequency is to select a one millisecond sample of the Wide Area Augmentation System signal for coherent integration (Fourier transformation) and select twenty of one millisecond samples of the lower frequency global position system sample clock frequency for an incoherent integration. As a result of these integrations an initial point of the C/A code is identified every 20 milliseconds and in 2 seconds this 20 milliseconds operation is performed 100 times. In actuality the length of the data string used is not critical and the length used can be made signal-strength-dependent; i.e., for strong signals less data may be used. For noise accommodation the resulting samples may be added point for point in order to enhance the signal, an in phase addition. The noise both adds and subtracts in this addition and therefore becomes less significant with respect to the signal. Again the idea is to average 100 points of data to obtain a more dependable and noise influence-free result.

Figure 3:
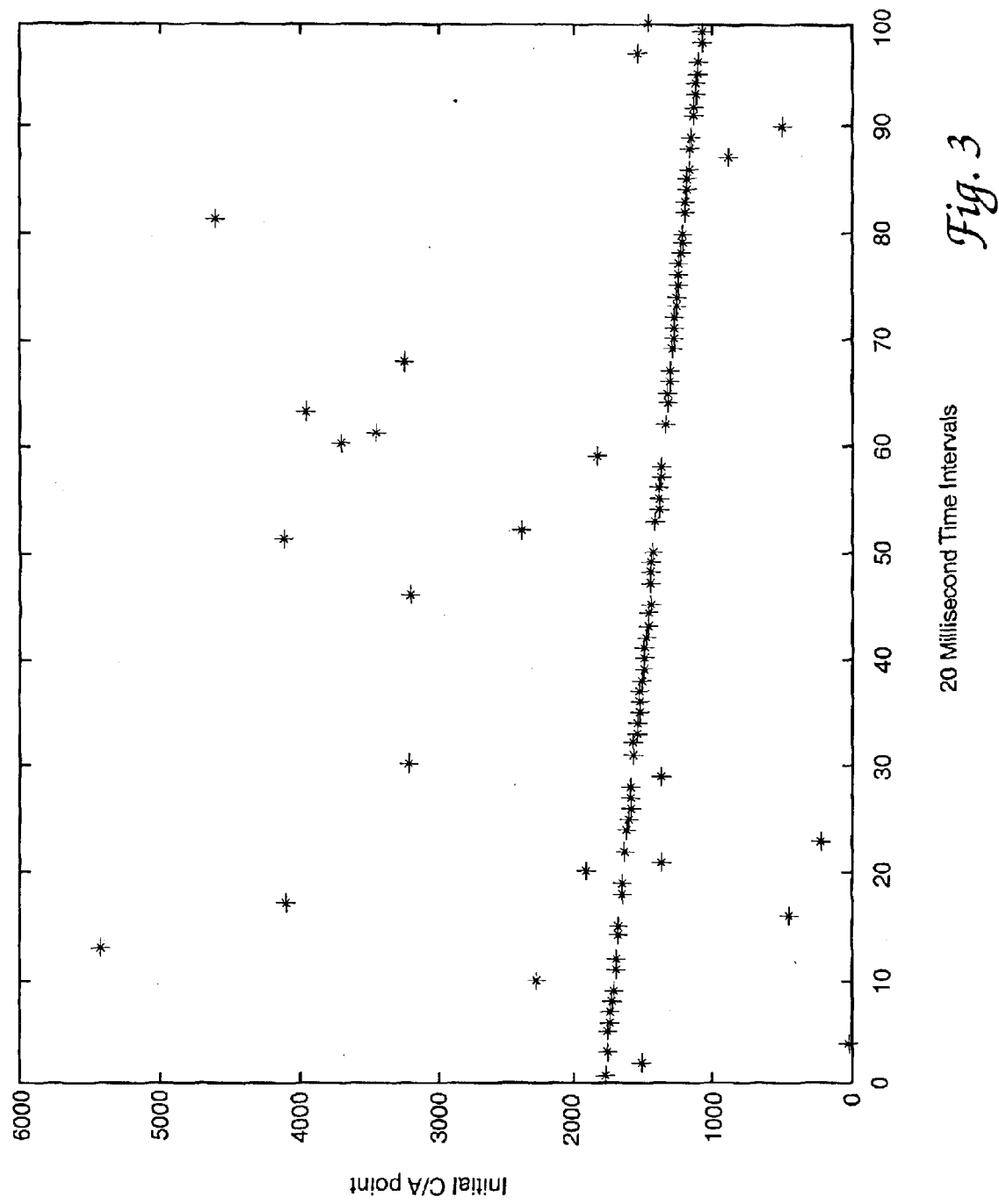
FIG. 3 shows another representation of erroneous receiver sampling frequency in a first form usable in a sampling frequency determination procedure.

FIG. 3 in the drawings therefore shows the results of 100 consecutive initial phase of the C/A code located through such integration processing. In FIG. 3 the vertical axis indicates the identified initial C/A point locations (between locations 0 and 5456 of the Motorola receiver with its sampling frequency) and the abscissa is time in 20 millisecond intervals. One can see that most of the FIG. 3 data points lie on a straight line, a straight line that is sloping rather than horizontal because there is error in the receiver sampling frequency. FIG. 3 also shows there are many obviously erroneous C/A point locations, locations not on the straight line in the data, because of noise and other spurious effects. To further process the FIG. 3 data these erroneous points must be eliminated and a line fitted through the correct data. There should be many methods to accomplish this goal and obtain the "desired line" of data. One of the methods is disclosed here.

Figure 4:
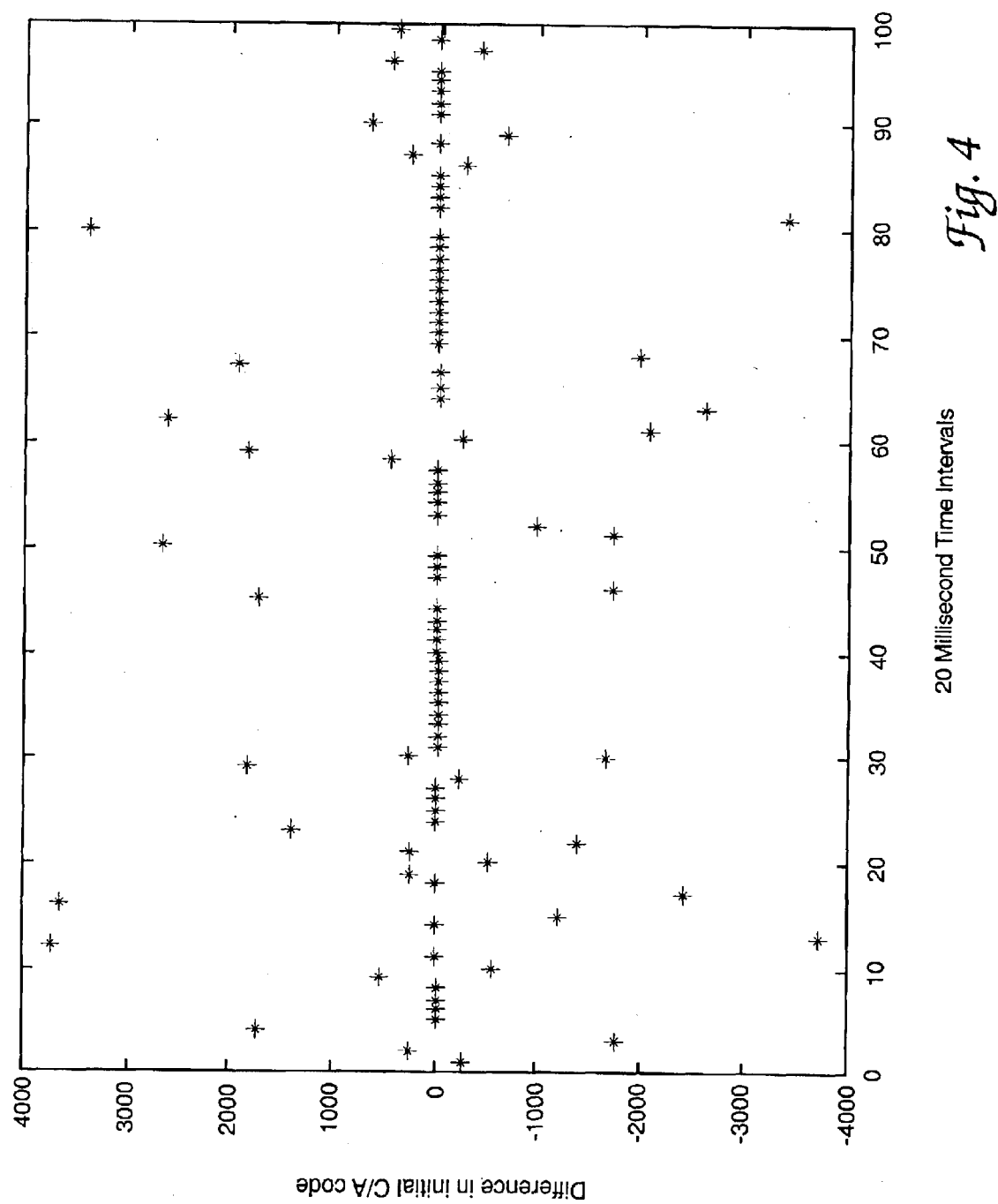
FIG. 4 shows another representation of erroneous receiver sampling frequency in a second form usable in a sampling frequency determination.
Figure 5:
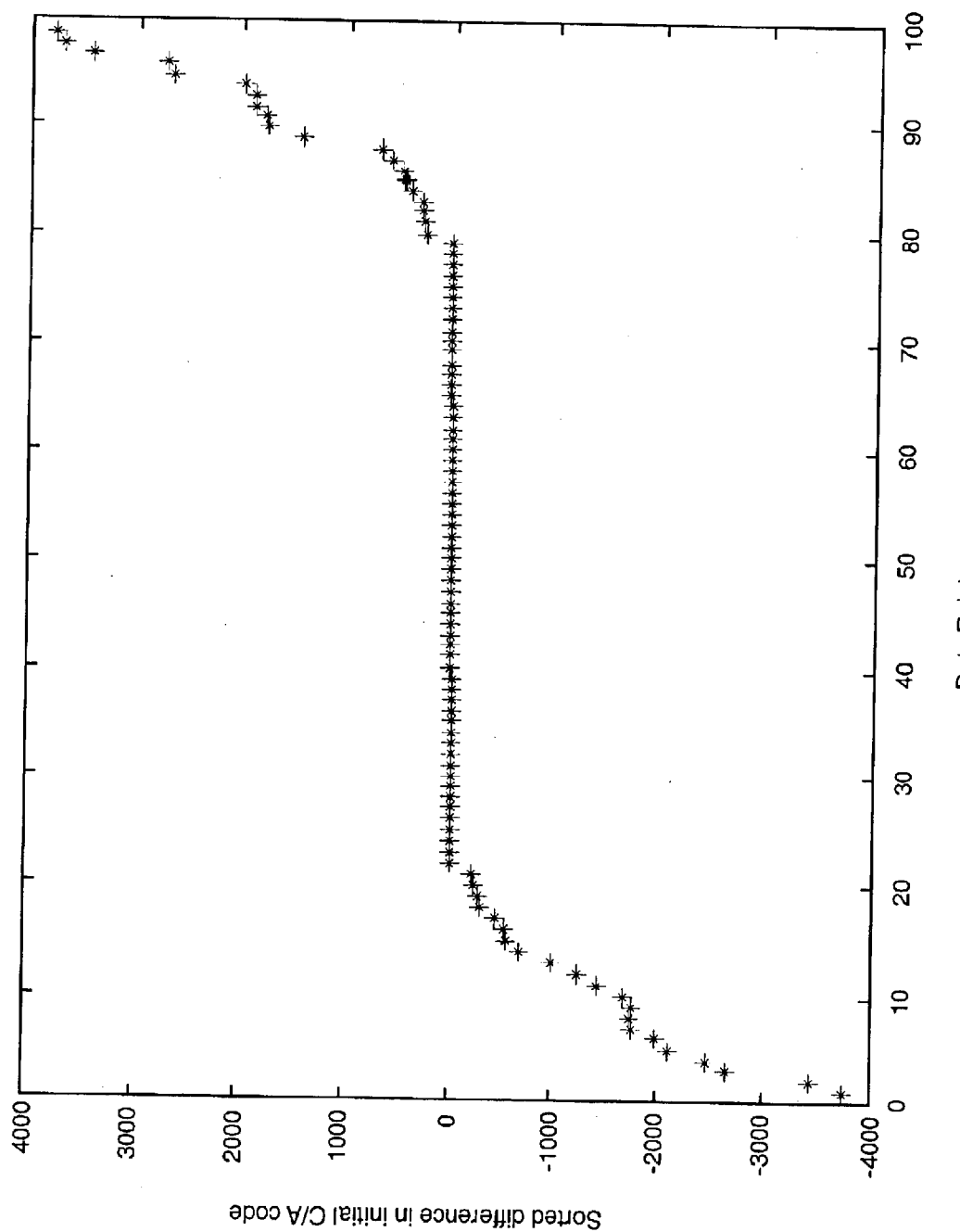
FIG. 5 shows another representation of erroneous receiver sampling frequency in a third form usable in a sampling frequency determination.

FIG. 4 in the drawings shows the difference values of the initial phase of C/A code locations in FIG. 3 with respect to the FIG. 3 sloping straight line of data. The FIG. 4 representation of the FIG. 3 data is obtained by taking the difference between each two adjacent samples, a step easily accomplished in software. The majority of the FIG. 4 data points are close to the constant value at zero difference in C/A code location; it is desirable to retain these majority points. FIG. 5 shows the sorted difference values from FIG. 4 in an arrangement ordered from negative to positive difference values. The horizontal scale in the FIG. 5 drawing represents data point numbering and therefore extends from 0 to 100 in view of the 100 consecutive initial phase i.e., the 100 points of data, considered in the FIG. 3 drawing. In order to avoid the erroneous data of the FIG. 5 extreme difference values, only 25 data points in the center portion of the FIG. 5 data are used to obtain the slope of the desired data line in FIG. 3. An average value and a standard deviation for the data represented in FIG. 5 can be found from these 25 points of data. The average value represents the slope of the desired line in FIG. 3. The standard deviation can be used to eliminate the erroneous data of the extreme difference values as described below.

Figure 6:
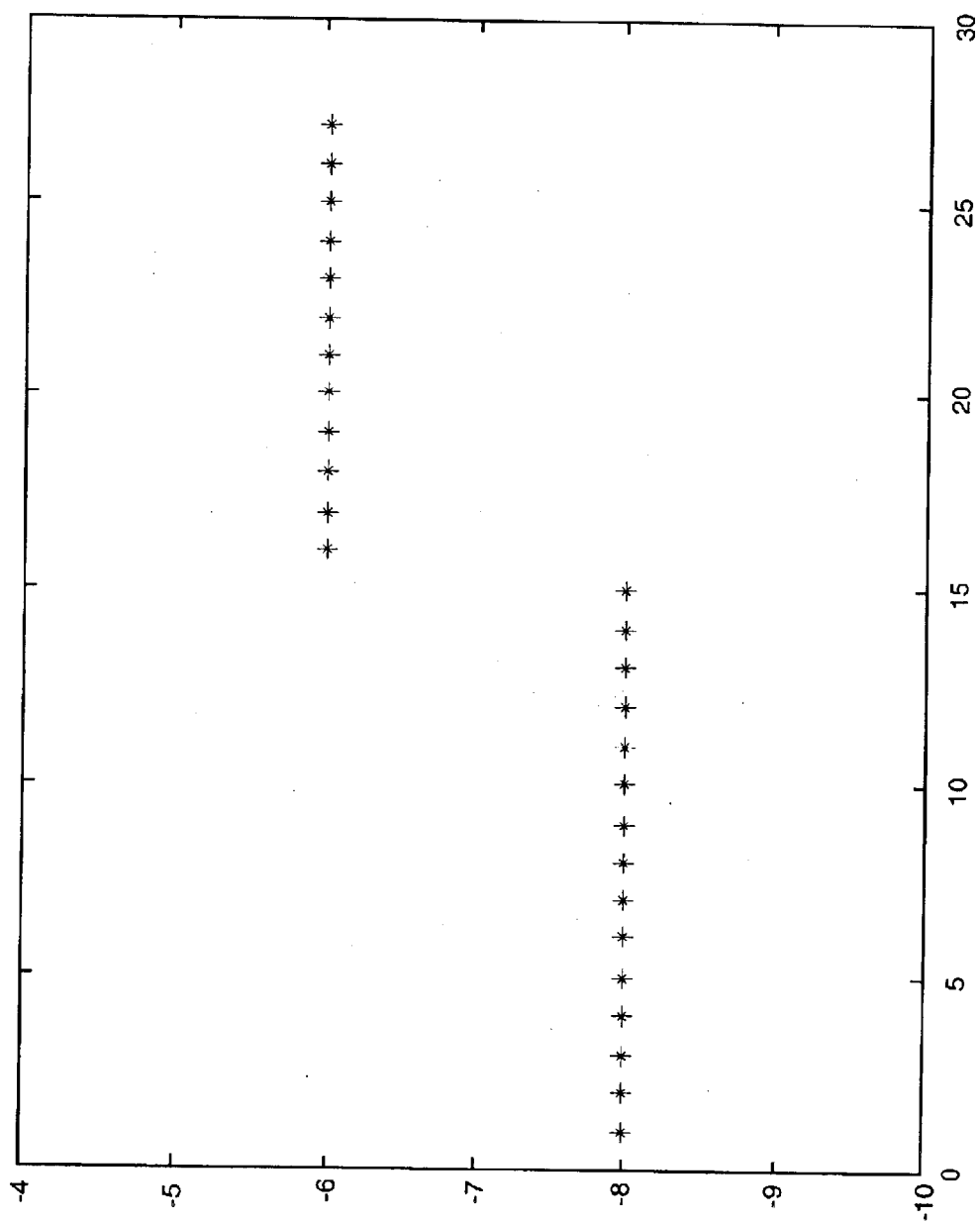
FIG. 6 shows another representation of erroneous receiver sampling frequency in a fourth form usable in a sampling frequency determination.

The center portion of the FIG. 5 sorted difference values comprises the desired data for global position system receiver sample clock correction. The results of selecting the data portion at for example the points 40±12 along the FIG. 5 horizontal scale are shown, employing a higher resolution vertical scale, in the FIG. 6 drawing. As a result of the 20-millisecond integration periods used for noise reduction, the FIG. 6 data is delayed by some 7 C/A code increments. Since however each second data point is selected from the FIG. 5 centroid data in the interest of simplicity, the FIG. 6 data collects at delays of either 6 or 8 C/A code increments rather than the 7 C/A code increments location as would be expected. Once the slope of a processed FIG. 3 data-line is known, one can draw a straight line passing through any valid initial C/A data point in order to represent the processed data output. Such a valid initial C/A data point can be determined by examination of the difference initial points data. For example, if a difference value is obtained from two adjacent points $n_k$ or $n_{k+1}$ and its value is very close to the data slope line, either point $n_k$ or $n_{k+1}$ can be considered as a valid point and used as the point from which to draw the output data line of known slope.

Figure 7:
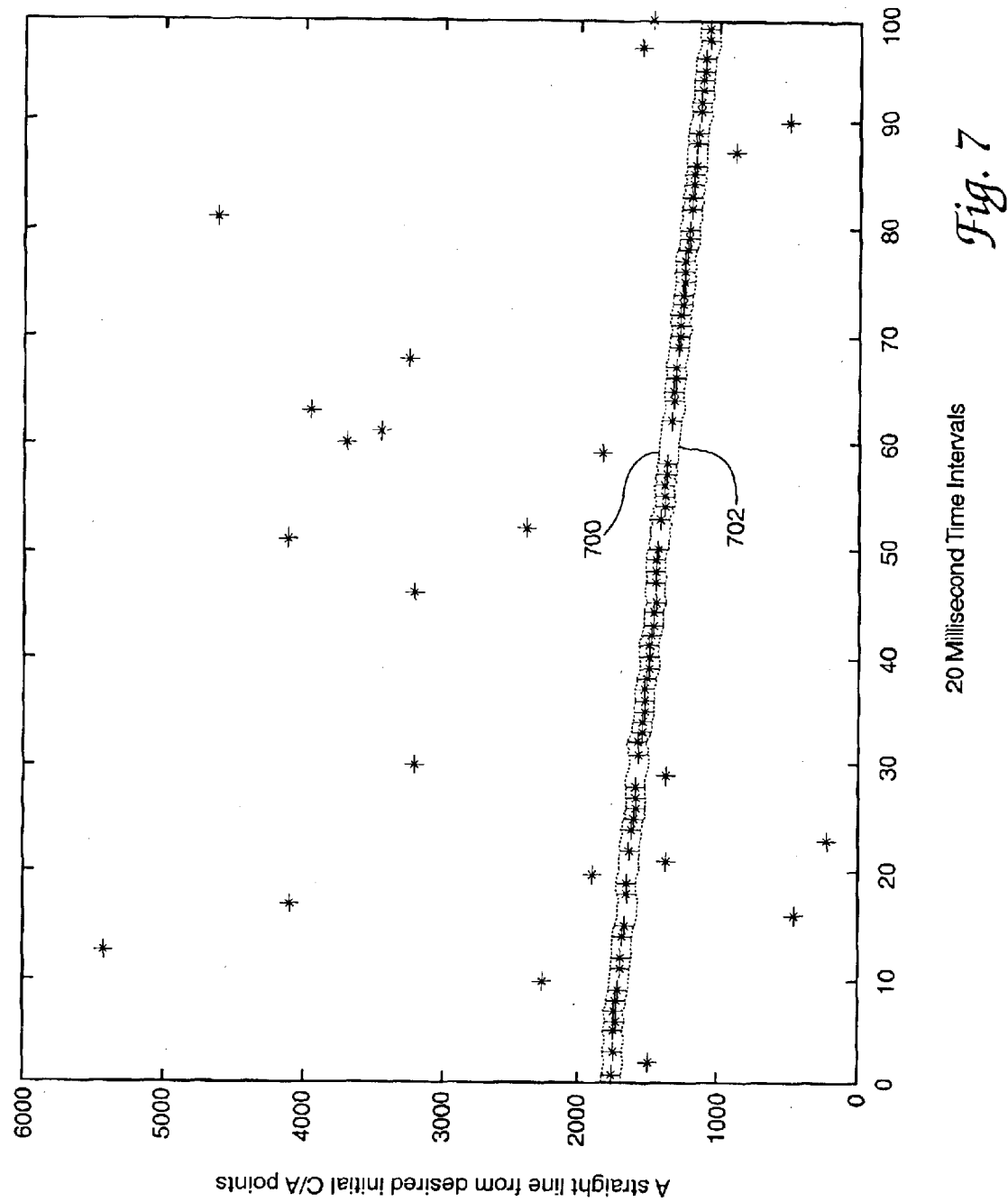
FIG. 7 shows another representation of erroneous receiver sampling frequency in a fifth form usable in a sampling frequency determination.
Figure 8:
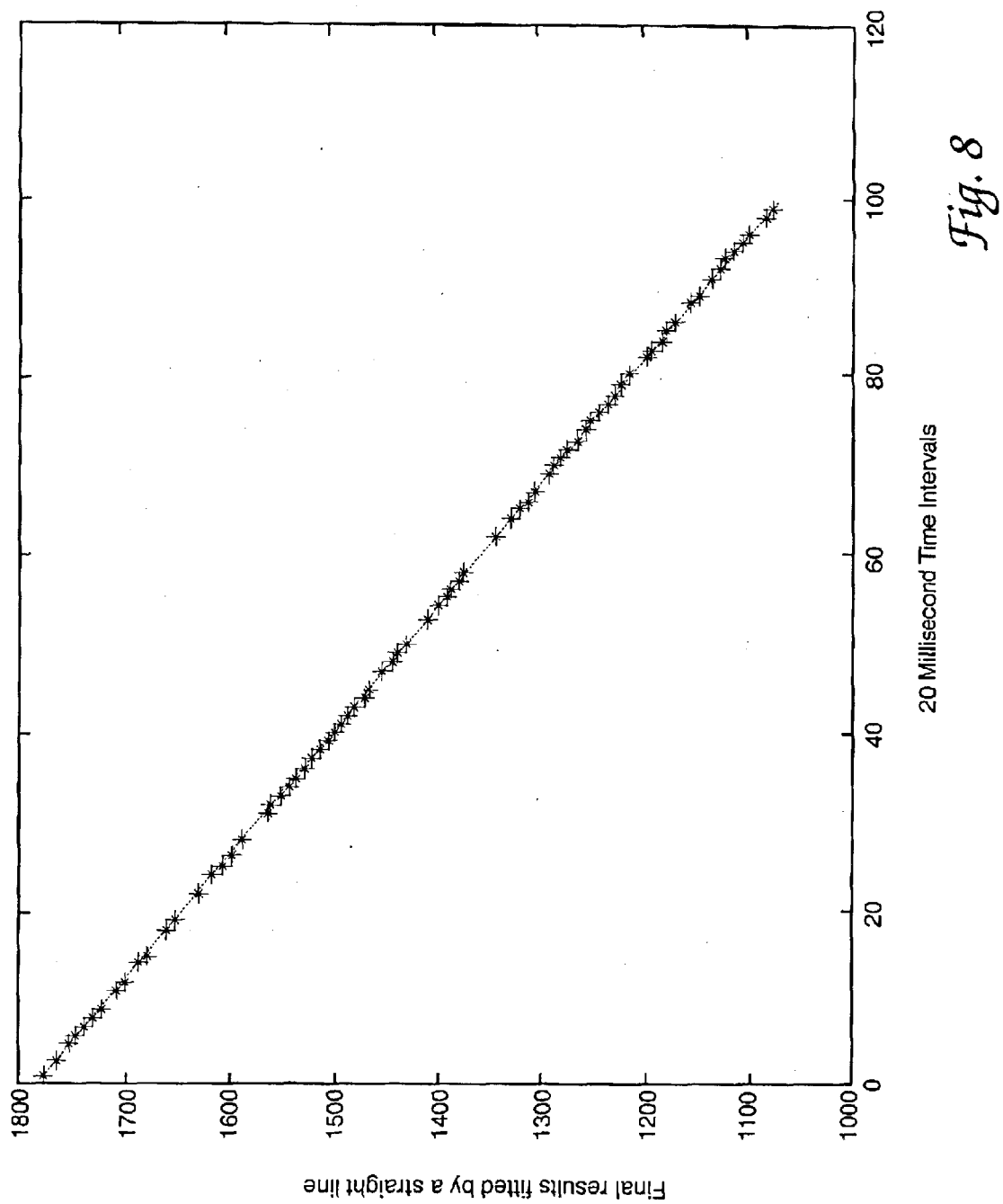
FIG. 8 shows another representation of erroneous receiver sampling frequency in a sixth form usable in a sampling frequency determination.

With respect to elimination of the erroneous data relating to the FIG. 5 extreme difference values, experience has shown that a ±5σ standard deviation criteria is satisfactory for use as the threshold to eliminate the erroneous points. FIG. 7 shows that the two lines 700 and 702 enclose the good data points. These good points are fitted into a straight line as shown in the drawing of FIG. 8. As explained above, one may ignore the actual data points along this line and select an initial and later C/A points corresponding to x(1) and x(101) and call them y(1) and y(101). In this example, there are 100 raw data points, but on the line one can obtain any number of points. From x(1) to x(101) covers 2 seconds of time. The number of points shifted per second can be calculated as $$p = \frac{y(1) - y(101)}{2} \quad (2)$$

Because there are 2 seconds of data the difference is divided by 2. It should be noted that in this operation, theoretically, the data length could vary. Once the FIG. 8 straight line is found, the points shifted per second can be found. The sampling frequency can be found from Equation (1).

The actual sampling frequency of the receiver being used can be calculated from every two seconds of data operated-upon according to the preceding description. From a test or experimental measurement of two different receiver sampling frequencies the average sampling frequencies measured are 5.45565685 megahertz and 5.45564080 megahertz (5455656.85 and 5455640.80 Hertz respectively) with standard deviations of 0.22 and 0.26 Hertz respectively for the two different receivers. A frequency counter used to check one of the receiver sampling frequencies; indicates frequencies between 5.455641 megahertz and 5.455642 megahertz (5455641 and 5455642 Hertz respectively) with the difference occurring because the counter has a resolution of 1 Hertz. If a very stable signal generator is used to generate a 5455640 80 Hertz signal the counter again displays 5455641 and 5455642 Hertz as the signal generator frequency. These experiments indicate the measurements made according to the disclosed arrangement are rather accurate, almost as close as the measurements made with a frequency counter.

While the apparatus and method herein described constitute a preferred embodiment of the invention, it is to be understood that the invention is not limited to this precise form of apparatus or method and that changes may be made therein without departing from the scope of the invention as is defined in the appended claims.

We claim:

1. A GPS calibration system comprising the combination of:
    a GPS digital radio receiver having a sampling algorithm operating at a receiver sampling frequency and a range computation algorithm embodied therein;
    a GPS satellite emitting digitally coded geographic location identification signals receivable by said GPS digital radio receiver;
    a Wide Area Augmentation System station broadcasting GPS error correcting data to a geographic region inclusive of said GPS digital radio receiver;
    said Wide Area Augmentation System station generating a broadcast signal inclusive of a known precise frequency signal component controlled by a Wide Area Augmentation System clock of enhanced timing accuracy with respect to said GPS digital radio receiver sampling frequency;
    frequency comparison apparatus in said GPS digital radio receiver and generating a difference signal responsive to timing difference errors between said GPS digital radio receiver sampling frequency and a correct value of said sampling frequency determined from said Wide Area Augmentation System known precise frequency signal component;
    said frequency comparison apparatus including both a coherent mathematical integration function and an incoherent mathematical integration function; and
    range computation algorithm correction apparatus located in said GPS digital radio receiver and responsive to said receiver sampling frequency and said difference signal.

2. The GPS system of claim 1 wherein said Wide Area Augmentation System station is located in an additional earth satellite having a geo-stationary orbit.

3. The GPS system of claim 1 wherein said Wide Area Augmentation System known precise frequency signal component comprises a coarse acquisition code repetition frequency output of said Wide Area Augmentation System.

4. The GPS system of claim 3 wherein said coarse acquisition code includes a one millisecond burst of coarse acquisition code signals.

5. The GPS system of claim 1 wherein said coherent integration function comprises a Fourier transformation algorithm.

6. The GPS system of claim 1 wherein said Wide Area Augmentation System signal includes a substantial noise component when received at said global position system digital radio receiver and wherein said frequency comparison apparatus includes incoherent integration apparatus having a summation of repeated integrations signal from noise extraction characteristic.

7. The GPS system of claim 1 wherein said digital radio receiver range computation algorithm comprises a GPS pseudo-range computation algorithm.

8. A method of providing pseudo range determinations of limited receiver sampling frequency inaccuracy influence from a global position system radio receiver, said method comprising the steps of:
    coupling signals received from at least one global position system satellite and signals received from a Wide Area Augmentation System station into said global position system radio receiver;
    extracting signals representing radio receiver sampling frequency from a global position system satellite signal processing portion of said global position system radio receiver;
    educing signals representing a coarse acquisition code portion of said Wide Area Augmentation System signal received from said Wide Area Augmentation System station;
    comparing said signals representing radio receiver sampling frequency with a selected number of said signals representing a coarse acquisition code portion of said Wide Area Augmentation System signal;
    said comparing step including both a coherent mathematical integration and an incoherent mathematical integration; and
    correcting pseudo range computations accomplished in said satellite signal processing portion of said global position system radio receiver, computations influenced by said global position system radio receiver sampling frequency, by a correcting factor responsive to differences between said signals representing radio receiver sampling frequency and signals representing a coarse acquisition code portion of said Wide Area Augmentation System signal as determined in said comparing step.

9. The method of providing pseudo range determinations of limited radio receiver sampling frequency inaccuracy of claim 8 wherein:

said step of coupling signals received from at least one global position system satellite into said global position system radio receiver comprises coupling signals received from four global position system satellites into said global position system radio receiver; and said steps of extracting and comparing are repeated for each of said four signals received from said four global position system satellites.

10. The method of providing pseudo range determinations of limited radio receiver sampling frequency inaccuracy of claim 8 wherein said step of coupling signals received from a Wide Area Augmentation System station into said global position system radio receiver comprises coupling signals received from one of an earth based and a satellite based Wide Area Augmentation System station into said global position system radio receiver.

11. The method of providing pseudo range determinations of limited receiver sampling frequency inaccuracy of claim 8 wherein said step of educing signals representing a coarse acquisition code portion of said Wide Area Augmentation System signal received from said Wide Area Augmentation System station includes accessing a coarse acquisition code signal component having a one millisecond period within said Wide Area Augmentation System signal.

12. The method of providing pseudo range determinations of limited radio receiver sampling frequency inaccuracy of claim 8 wherein said step of comparing said signals representing radio receiver sampling frequency with a selected number of said signals representing a coarse acquisition code portion of said Wide Area Augmentation System signal includes collecting a sequential plurality of said Wide Area Augmentation System signals over a time interval and combining said collected signals into an enhanced Wide Area Augmentation System signal in accordance with a signal to noise ratio-enhancing repetitive combinational algorithm.

13. Global position system apparatus comprising the combination of:

a global position system radio frequency receiver;

means for coupling radio frequency signals received from at least one global position system satellite and radio frequency signals received from a Wide Area Augmentation System station into said global position system radio frequency receiver;

means for extracting signals representing radio frequency receiver sampling frequency from a global position system satellite signal processing portion of said global position system radio frequency receiver;

means for generating signals representing a coarse acquisition code portion of said Wide Area Augmentation System signal received from said Wide Area Augmentation System station;

means for comparing said signals representing receiver sampling frequency with a selected number of said signals representing a coarse acquisition code portion of said Wide Area Augmentation System signal;

said means for comparing including both a coherent mathematical integration function and an incoherent mathematical integration function; and means for correcting pseudo range computations accomplished in said satellite signal processing portion of said global position system radio frequency receiver, computations influenced by said global position system radio frequency receiver sampling frequency, by a correcting factor responsive to differences between said signals representing radio frequency receiver sampling frequency and signals representing a coarse acquisition code portion of said Wide Area Augmentation System signal as determined in said means for comparing.

14. The global position system apparatus of claim 13 wherein said signals representing a coarse acquisition code portion of said Wide Area Augmentation System signal received from said Wide Area Augmentation System station comprise coarse acquisition code signals inclusive of a one millisecond time component.

15. The global position system apparatus of claim 13 wherein said Wide Area Augmentation System station is located in a satellite having a geo stationary earth orbit and substantially zero signal Doppler frequency component generating characteristics.

16. The method of providing pseudo range determinations of limited radio receiver sampling frequency inaccuracy of claim 8 wherein said comparing step includes selecting a sample of said Wide Area Augmentation System signal for Fourier transformation coherent integration and selecting samples of said global position system receiver sampling frequency for an incoherent integration.

* * * * *